United States Patent Office 2,827,385
Patented Mar. 18, 1958

2,827,385
QUICK SETTING CEMENT

Frank H. Lyons, Memphis, Tenn., assignor to E. L. Bruce Company, Memphis, Tenn., a corporation of Delaware No Drawing. Application October 25, 1954
Serial No. 464,650

1 Claim. (Cl. 106—90)

This invention relates to a cement and, more particularly, relates to a quick setting cement having particular utility in the construction field.

In the construction field there has been a great need for a cement with high compression strength which would set in a short period of time. By way of example, the cement of this invention can be used to replace termite infected wood in structural members, thus saving the far greater cost of replacing the structural member. Further, since it sets quickly, the cement of this invention does not require the termite control crew to make a return trip to the job.

The cement in accordance with this invention contains calcium acrylate and Portland cement and is mixed with water for application.

More specifically, the calcium acrylate will be present in an amount of from about 3 to about 10 parts by weight. The Portland cement will be present in an amount from about 20 to about 97 parts by weight. A polymerization catalyst for the calcium acrylate may also be included if a faster setting time is desired. The catalyst may be, for example, sodium thiosulfate or ammonium persulfate, or a mixture thereof, and will be present in an amount of from about 0.1 to 2 parts by weight. If desired, an inert filler may be included. The filler may be, for example, silex, calcium carbonate, barium carbonate, asbestine, gypsum, raw sienna or ground slag.

The water will be added in an amount of from about 25% to about 50% by weight of the cement-water mixture.

The cement will readily be prepared by mixing the calcium acrylate with Portland cement and adding filler and catalyst, if they are to be employed. The addition of and mixing with water forms a viscous mass which sets rapidly.

The following examples will further clarify the invention:

Example 1

| | Parts by weight |
|---|---|
| Portland cement | 30 |
| Silex | 62 |
| Calcium acrylate | 8 |
| Sodium thiosulfate | 1¼ |
| Ammonium persulfate | 1¼ |

The above ingredients were thoroughly mixed. For application 30 parts by weight of water were added and thoroughly mixed.

Example 2

| | Parts by weight |
|---|---|
| Portland cement | 33 |
| Silex | 62 |
| Calcium acrylate | 5 |
| Sodium thiosulfate | 1 |
| Ammonium persulfate | 1 |

The above ingredients were thoroughly mixed. For application 30 parts by weight of water were added and thoroughly mixed.

Example 3

| | Parts by weight |
|---|---|
| Portland cement | 90 |
| Calcium acrylate | 7 |

The above ingredients were mixed. For application there was added 40 parts by weight of water.

Example 4

| | Parts by weight |
|---|---|
| Portland cement | 50 |
| Calcium acrylate | 10 |
| Sodium thiosulfate | 0.5 |

The above ingredients were thoroughly mixed. For application there was added 20 parts by weight of water.

It is not desired to be limited except as set forth in the following claim.

What is claimed is:

A cement consisting essentialy of from about 20 to about 97 parts by weight of Portland cement, from about 3 to about 10 parts by weight of calcium acrylate and from about 0.1 to about 2 parts by weight of a catalyst selected from the group consisting of sodium thiosulfate and ammonium persulfate.

References Cited in the file of this patent

UNITED STATES PATENTS

| | | |
|---|---|---|
| 1,976,679 | Fikentacher et al. | Oct. 9, 1934 |
| 2,019,980 | Krauss | Nov. 5, 1935 |
| 2,157,018 | Rodwell | May 2, 1939 |
| 2,317,328 | Kinney | Apr. 20, 1943 |
| 2,542,364 | Schenker et al. | Feb. 20, 1951 |
| 2,614,998 | Lea | Oct. 21, 1952 |
| 2,648,645 | Boris et al. | Aug. 11, 1953 |
| 2,651,619 | De Mells et al. | Sept. 8, 1953 |
| 2,672,793 | Rowe et al. | Mar. 23, 1954 |

FOREIGN PATENTS

| | | |
|---|---|---|
| 437,446 | Great Britain | Oct. 28, 1935 |
| 466,229 | Great Britain | May 25, 1937 |
| 701,668 | Great Britain | Dec. 30, 1953 |
| 629,513 | Germany | May 5, 1936 |